March 23, 1937. W. B. SUMMERALL 2,074,522
AUTOMOBILE SEMAPHORE
Filed Jan. 4, 1935 3 Sheets-Sheet 2
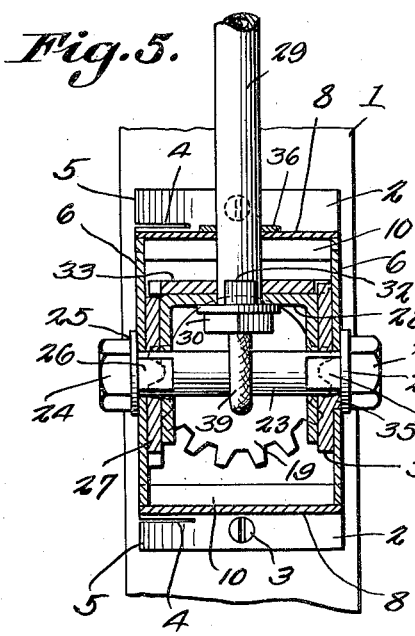
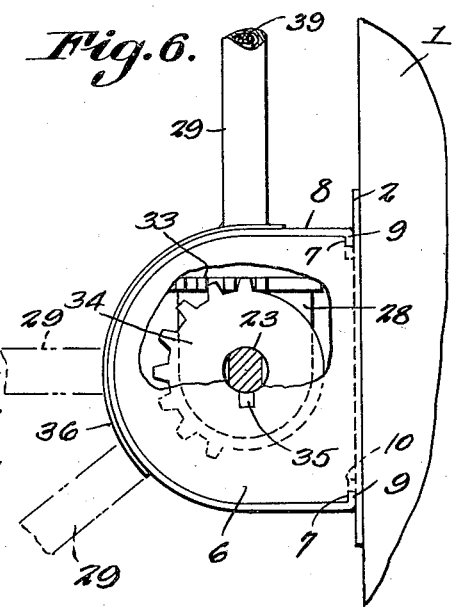
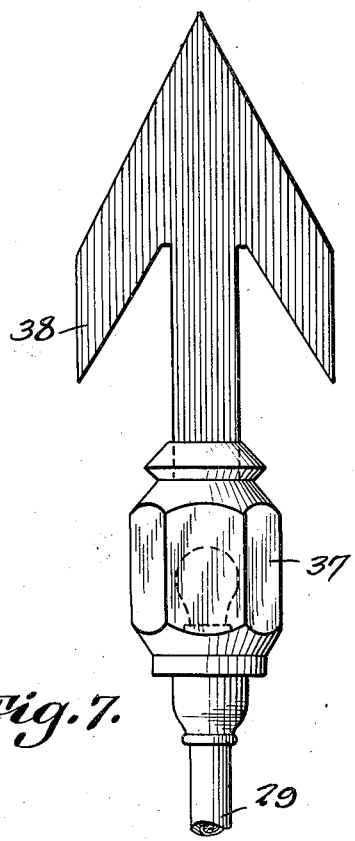
Inventor
W. B. Summerall
By C A Snow & Co.
Attorneys.

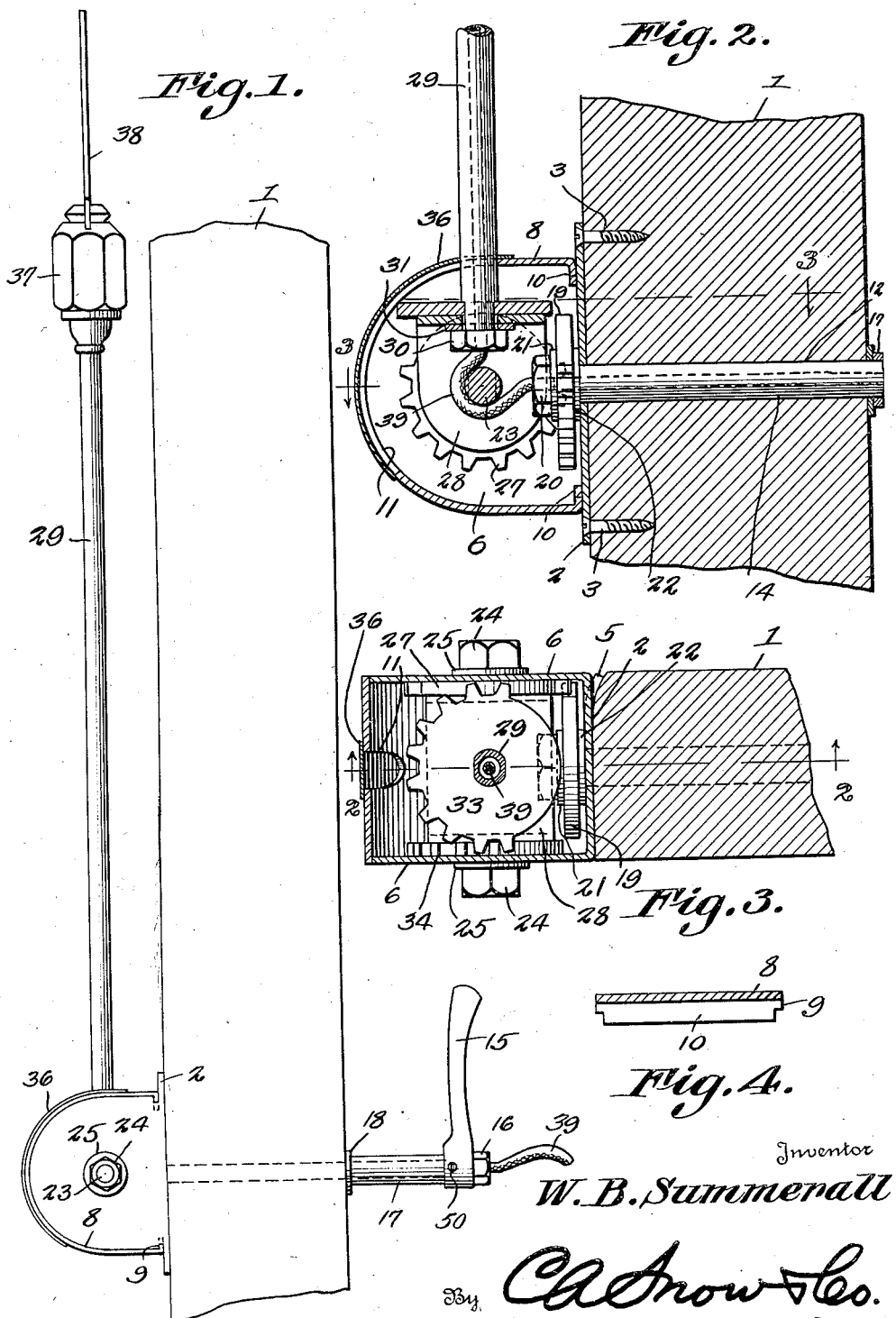

March 23, 1937.  W. B. SUMMERALL  2,074,522
AUTOMOBILE SEMAPHORE
Filed Jan. 4, 1935  3 Sheets-Sheet 3
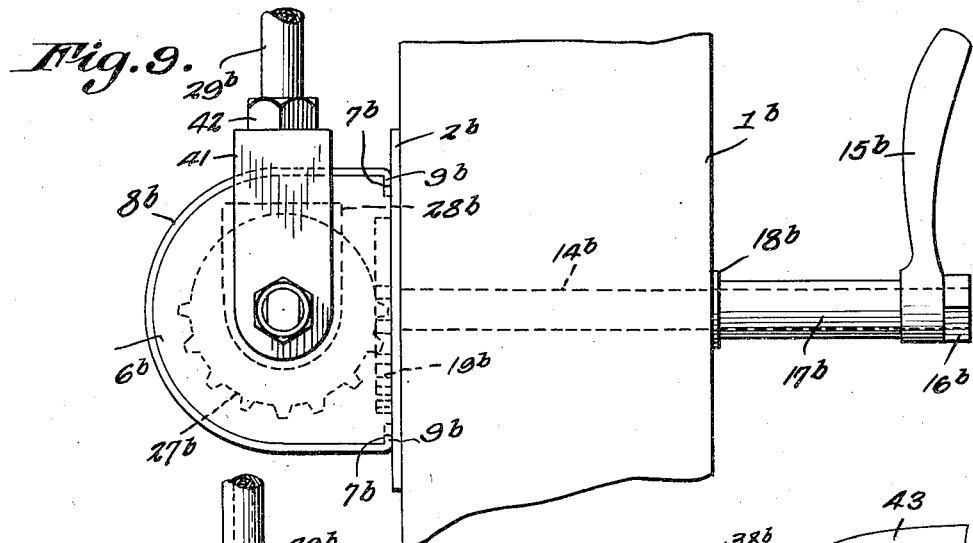
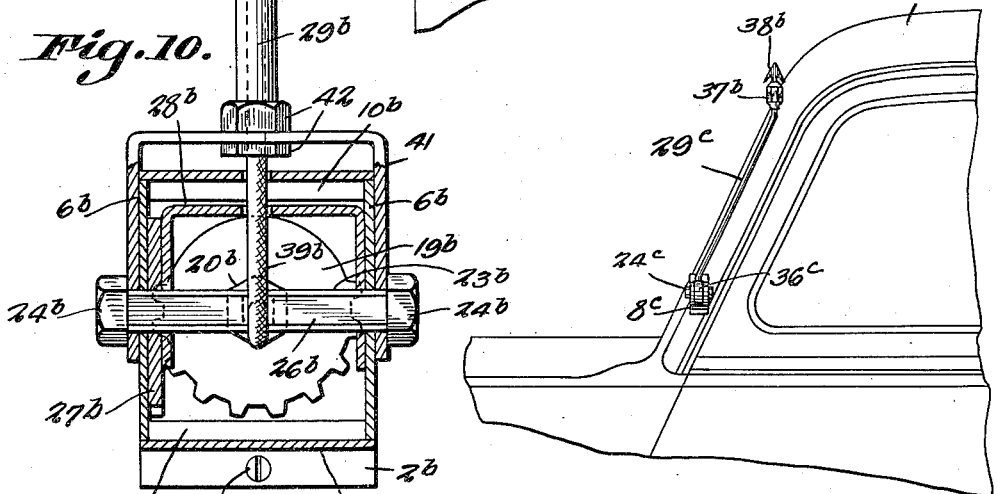
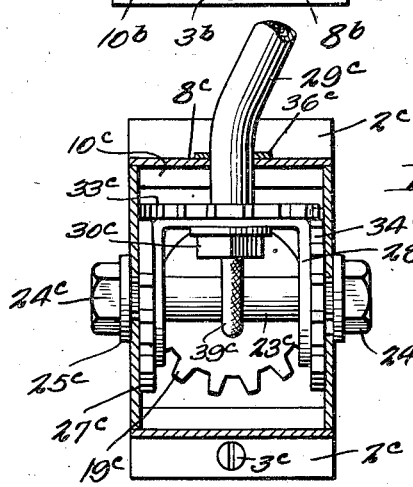
W. B. Summerall, Inventor Patented Mar. 23, 1937

2,074,522

UNITED STATES PATENT OFFICE 2,074,522

AUTOMOBILE SEMAPHORE

William B. Summerall, Atlanta, Ga.

Application January 4, 1935, Serial No. 443

1 Claim. (Cl. 116—51)

This invention aims to provide a signal arm which may be attached readily to a vehicle, and be moved up and down, from a point within the car, at the will of an operator, to indicate to pedestrians and the drivers of vehicles, the purpose of the driver of the car whereon the device claimed is mounted, relative to turning, continuing on a straight course, backing, and the like. The invention aims to provide novel means for raising and lowering the signal arm, and for rotating it on its axis, if desired. Another object of the invention is to provide novel means whereby the signal arm may include an illuminated part, if desired. The invention aims to improve the housing wherein most of the working parts are located. Another object of the invention is to improve the mechanism which transmits motion from a shaft under the control of an operator, to the vertically swinging signal arm.

It is within the province of the disclosure to improve generally and to enhance the utility of devices of that type to which the invention pertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in elevation, a device constructed in accordance with the invention;

Fig. 2 is a vertical view partly in section showing a portion of the structure delineated in Fig. 1;

Fig. 3 is a horizontal section on the line 3—3 of Fig. 2;

Fig. 4 is a view partly in section showing a detail of the cover;

Fig. 5 is a vertical section through the device shown in Fig. 2;

Fig. 6 is a side elevation wherein parts are broken away;

Fig. 7 is an elevation showing a portion of the signal arm and the indicator thereon;

Fig. 8 is an elevation showing a modified form of lamp;

Fig. 9 is an elevation showing a modified form of the invention;

Fig. 10 is a vertical section of the structure shown in Fig. 9, parts being in elevation;

Fig. 11 is a vertical section showing a modified form of the invention;

Fig. 12 is a side elevation showing a part of a car, with the mechanism of Fig. 11 mounted thereon;

Fig. 13 is an elevation showing a modification in the signal arm and attendant parts.

In Figs. 1 to 7, the numeral 1 designates a support, such as the front post of the body of an automobile. A housing is provided, and may be made of metal or any other suitable material. The housing comprises a base plate 2 held on the outside of the part 1 by securing elements 3 (Figs. 2 and 5). Slits 4 may be formed in the forward edge of the base plate 2, near to the ends thereof. The slits 4 form bendable tongues 5. The tongues 5 may be bent to conform to the transverse corner section of the part 1, as shown in Fig. 3.

The base plate 2 carries forwardly extended parallel wings 6 (Fig. 3). The wings 6 have rounded outer ends, as Fig. 2 will show. Notches or seats 7 are formed in the upper edges of the wings 6 and in the lower edges thereof, close to the base plate 2 (Fig. 6). A resilient cover 8 fits over the wings 6 of the base plate 2 and tends to grip the wings. At its inner end, and at its top and bottom, the cover 8 has flanges 9 which project toward each other. The flanges 9 (Fig. 6) fit in the seats 7 of the wings 6 and prevent the cover 8 from moving to the left in Fig. 6. Figure 4 shows that the flanges 9 have tongues 10 which project toward each other. The tongues 10 (Fig. 5) fit closely between the wings 6 of the base plate 2 and prevent the cover 8 from moving to the right or the left in Fig. 5. The construction is such that, although the cover 8 is held securely upon the wings 6 of the base plate 2, the cover can be taken off or replaced without loosening bolts or screws. In its curved portion, the cover 8 has a vertical slot 11 (Figs. 2 and 3).

A horizontal bore 12 (Fig. 2) is formed in the post 1. A first or operating shaft 14 is journaled in the bore 12. The shaft 14 is hollow. A handle 15 is secured by a set screw 50 or the like to the inner end of the shaft 14 (Fig. 1). A nut 16 is threaded on the shaft 14 and bears against the handle 15. A washer 18 surrounds the shaft 14 and abuts against the inner surface of the post 1. A sleeve 17 is mounted on the shaft 14, between the washer 18 and the handle 15.

A vertical gear wheel 19 is mounted on the inner end of the shaft 14, within the housing. The gear wheel 19 is held on the shaft 14 by a nut 20 (Fig. 2). A washer 21 is mounted on the shaft 14, between the nut 20 and the gear wheel 19. A washer 22 is mounted on the shaft 14, between the gear wheel 19 and the base plate 2 of the housing. Since the handle 15 is releasably held on the shaft 14 by the set screw 50, the nut 16 of Fig. 1 may be tightened up to move the shaft 14 to the right in Fig. 2 and to cause the washer 22 to bear against the base plate 2 with greater or less drag. In this way, the shaft 14, although rotatable at the will of an operator, through the instrumentality of the handle 15, is held frictionally against rotating too freely.

A second or horizontal shaft 23 is arranged at right angles to the operating shaft 14. The shaft 23 is journaled in the wings 6 of the base plate 2. Nuts 24 and washers 25 hold the shaft 23 against endwise movement (Fig. 5). Near to its ends, the shaft 23 has flat surfaces 26. A pinion 27 is arranged at right angles to the gear wheel 19 and meshes therewith. The pinion 27 rotates in contact with one of the wings 6, as shown in Fig. 5. The pinion 27 is held on the shaft 23, for rotation therewith, by one of the flat surfaces 26.

The shaft 23 carries a U-shaped yoke 28. The yoke 28 derives swinging movement, when the shaft 23 is rotated, because the arms of the yoke engage the flat surfaces 26 of the shaft 23.

A hollow arm 29 is journaled in the outer end of the yoke 28. A nut 30 and a washer 31 (Fig. 5) hold the arm 29 for rotation in the outer end of the yoke 28. The arm 29 has flat surfaces 32. The flat surfaces 32 hold a gear wheel on the arm 29, for rotation therewith. The gear wheel 33 rides on the outer surface of the end of the yoke 28. The gear wheel 33 on the arm 29 meshes with a fixed pinion 34. The pinion 34 is located (Fig. 5) between one of the wings 6 and one of the arms of the yoke 28. The pinion 34 is secured at 35, by a key or otherwise (Fig. 6) to the adjacent wing 6 of the housing.

The arm 29 has vertical movement in the slot 11 of the cover portion 8 of the housing (Fig. 1). The up and down movement of the arm 29 is limited by engagement with the cover 8 at the ends of the slot 11. A curved closure 36 is secured at one end to the arm 29. The member 36 conforms to the curve of the cover 8 and closes the slot 11 in the cover 8 when the arm 29 is in the raised or inoperative position of Fig. 2.

A signal is mounted on the outer end of the arm 29. The signal may be of any desired sort. It may include an electric lamp 37, showing light about its entire periphery and mounted on the outer end of the arm 29. The lamp carries an outwardly projecting indicator 38 which may be arrow-shaped, as shown in Fig. 7. The indicator might be of a different form, however. The conductors 39 for the lamp 37 extends longitudinally through the hollow arm 29, through the housing 8—2 (Fig. 2) and through the hollow shaft 14 (Fig. 1).

When the arm 29 is in the vertical, raised or inoperative position of Fig. 1, the indicator 38 lies parallel to the side wall of the car. The operator turns the shaft 14, from within the car, by means of the handle 15, it being understood that the shaft may project into the car as far as desired. The shaft 14 rotates the pinion 19 which it carries. The pinion 19, meshing with the pinion 27, rotates the shaft 23 and swings the yoke 28 and the signal arm 29 downwardly. When the signal arm 29 is swung downwardly, it carries downwardly the gear wheel 33. The gear wheel 33 meshes with the pinion 34, and because the pinion 34 is fixed, the gear wheel 33 and the signal arm 29 are rotated as they swing downwardly. This rotation of the signal arm 29 causes the indicator 38 to turn from the position of Fig. 1 (parallel to the side of the car) through an arc of ninety degrees, so that, by the time that the signal arm 29 is in lowered position, the indicator 38 presents its flat sides to approaching traffic, the indicator thereby being made the more visible.

The operator can actuate the device readily from within the car, either to cause the indicator 38 to change its position, or to move the lamp 37 up and down, thereby attracting attention to the lamp.

In Fig. 8, parts hereinbefore described have been designated by numerals previously used, with the suffix "a". The lamp 37a in Fig. 8 is provided with four bull's-eyes 40 arranged in pairs, and the members of the pairs being opposite to each other. The bull's-eyes 40 may be colored as desired or may indicate a white light, as to any or all of the bull's-eyes.

In Figs. 9 and 10, parts hereinbefore described have been designated by numerals previously used, with the suffix "b". In this form of the invention, the slot 11 of Figs. 2 and 3 in the cover 8 of those figures is omitted. A U-shaped radius arm 41 is held on the shaft 23b by the flat sides thereof, and is located externally of the housing. The signal arm 29b is secured at 42 to the outer end portion of the radius arm 41.

When the shaft 14b is rotated, the pinion 19b is rotated, the pinion 19b, meshing with the pinion 27b, rotates the shaft 23b and swings the yoke 28b, the radius arm 41, and the part 29b up and down, but there is no rotation of the signal arm 29b, because the fixed pinion 34 and the complemental gear wheel 33 of Fig. 5 are omitted.

In Fig. 12 there is shown a car 43 having a backwardly sloping front. In Figs. 12 and 11, parts hereinbefore described have been designated by numerals previously used, with the suffix "c". The signal arm 29c is not straight from end to end, but is offset, so that when it is in the raised position of Fig. 12, it will conform to the backward slope of the front of the body of the vehicle 43.

In Fig. 13, parts hereinbefore described have been designated by numerals previously used, with the suffix "d". In this form of the invention, the signal arm 29d carries an indicator 38d which is connected by a coupling 44 with the arm 29d, the part 44 being a coupling, in the place of the lamp 37 of Fig. 1. Figure 13 indicates that, in any of the forms of the invention hereinbefore described, the illumination feature afforded by the lamp 37 of Fig. 1 or by the lamp 37a of Fig. 8, may be omitted if desired.

Having thus described the invention, what is claimed is:

In a signal for autos, a casing having an opening, an operating shaft journaled in the casing, a second shaft journaled in the casing and located at right angles to the operating shaft, a yoke secured to the second shaft, within the casing, a signal arm journaled in the yoke and disposed approximately at right angles to the second shaft, the signal arm being movable transversely in the opening of the casing, intermeshing gear members secured to the shafts, the gear member of the second shaft being located between one side portion of the yoke and one side portion of the casing, a third gear member secured to the signal arm, and a fixed rack means with which the third member meshes, the said rack means being disposed between the opposite side portion of the yoke and the corresponding side portion of the casing.

WILLIAM B. SUMMERALL.